G. P. KETCHAM.
Car-Track Clearer.
No. 12,371.  Patented Feb. 6, 1855.
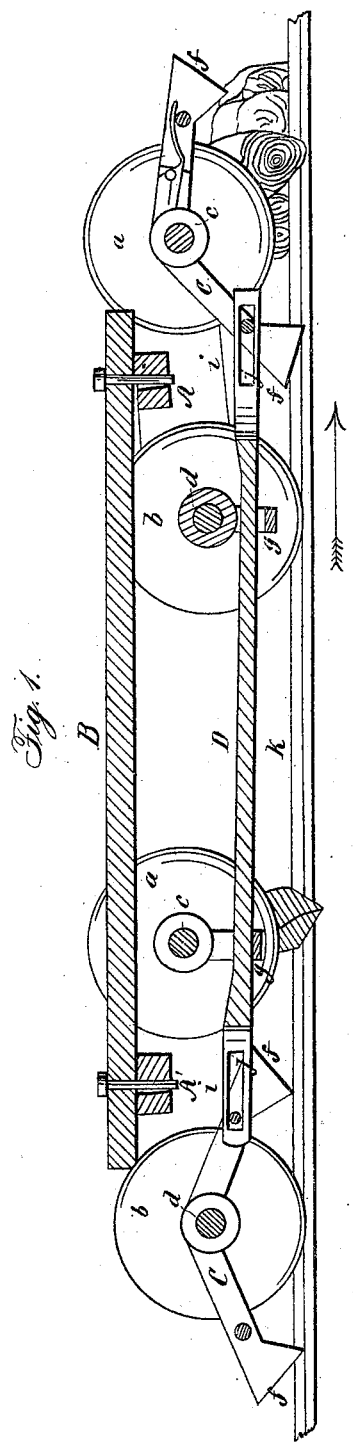
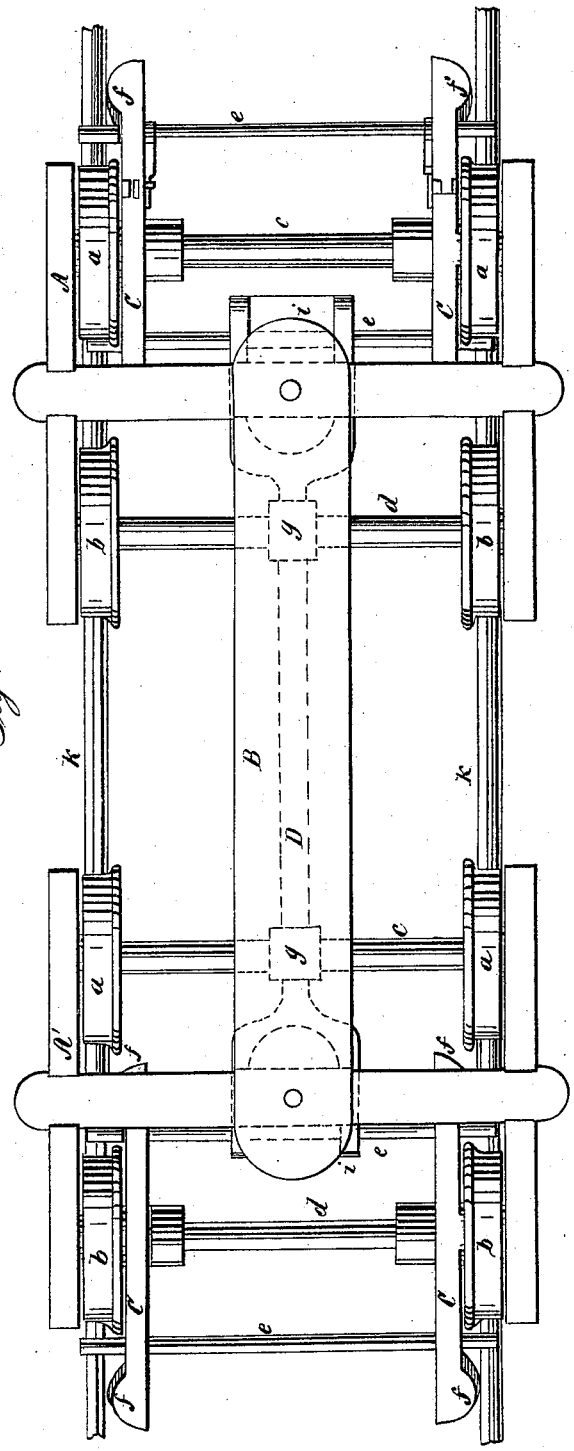

UNITED STATES PATENT OFFICE.

GEO. P. KETCHAM, OF BEDFORD, INDIANA.

MECHANISM FOR RETAINING CARS UPON THE TRACK.

Specification of Letters Patent No. 12,371, dated February 6, 1855.

*To all whom it may concern:*

Be it known that I, GEORGE P. KETCHAM, of Bedford, in the county of Lawrence and State of Indiana, have invented a new and useful Improvement in Railroad-Car Trucks; and I do hereby declare that the following is a full, clear, and exact description of the same, reference being had to the annexed drawings, making a part of this specification, in which—

Figure 1, is a longitudinal vertical section of my improved truck, the plane of section being through the center. Fig. 2, is a plan or top view of ditto.

Similar letters of reference indicate corresponding parts in the two figures.

This invention relates to a new and useful improvement in rail road car trucks, whereby cars are prevented from running off or being thrown from the rails in consequence of the wheels passing over obstacles thereon.

The nature of my invention consists in placing loosely upon one of the axles of each truck a pair of arms, the two pairs of arms of each pair of trucks being connected by a longitudinal rod, and so arranged as will be presently shown that when either pair of wheels is raised from the rails the ends of the arms will come in contact with the rails and serve as guides, either ends of the arms being in contact with the rails according to which pair of wheels is raised.

To enable others skilled in the art to fully understand and construct my invention I will proceed to describe it.

A, A', represents the two trucks of a rail road car connected as usual to the bed B of the car. The front wheels of each truck are designated by (*a*) and the back wheels by (*b*). The front axles are designated by (*c*) and the back axles by (*d*). On the front axle of the truck A and on the back axle of the truck A' are placed loosely arms C two, or one pair of arms, on each axle. The arms C on each axle are connected near each end by transverse rods (*e*) (*e*), and both ends of each arm are provided with convex flanches (*f*) as shown clearly in Fig. 2, the faces of the flanches being in line with the inner edges of the rails. The axles (*c*) (*d*) pass through the centers of the arms, as shown clearly in Fig. 1.

D is a rod or bar which passes through pendents (*g*) (*g*) attached loosely to the other axles of the trucks said axles working freely in the pendents. The rod D is fitted loosely in the pendents and each end of the rod is provided with a fork (*i*) having oblong slots (*j*) through its ends through which slots the inner bars (*e*) of each pair of arms passes.

The several parts of the improvement being now described its operation will be readily seen. Suppose the car to be going in the direction indicated by the arrow Fig. 1, the back ends of the arms C are to be even or down against the inner edges of the rails, which are designated by (*k*). Now if the front wheels of the forward truck A are raised by an obstacle upon the rails the back ends of the arm C on the front axle of the forward truck will prevent the forward truck from leaving the rails the flanches (*f*,) bearing against the inner edges of the rails, and if the back wheels of the same truck are raised by an obstacle the front ends of the arms C will then be depressed and act in the same manner, when one end of the arms are depressed the opposite ends are elevated. The rod D serves as a support to the arms and prevents their ends from descending too low so as to come in contact with the ground. The arms on the back truck A' act precisely similar to those on the forward truck. The slots (*j*) in the forks (*i*) are sufficiently long to allow for the vibration or play of the arms.

By the above improvement, the trucks are prevented from running off the rails or being thrown therefrom by obstacles. The device is simple and works well and may be applied to the ordinary trucks in use with trifling expense.

Having thus described my invention what I claim as new and desire to secure by Letters Patent, is—

The employment or use of arms C applied to the axles (*c*) (*d*) of the trucks A, A', the arms of each truck being supported by the rod D. The above parts being constructed and arranged in the manner and for the purpose as herein shown and described.

GEORGE P. KETCHAM.

Witnesses:
P. T. VESTAL,
HIRAM H. MCLANE.